United States Patent Office 2,849,327
Patented Aug. 26, 1958

2,849,327

COLD-WATER-SOLUBLE DEXTRINE ADHESIVE AND PROCESS OF MAKING IT

John J. Ryan, Brooklyn, N. Y., and Richard A. Weidener, Englewood, N. J., assignors to National Starch Products Inc., New York, N. Y., a corporation of Delaware No Drawing. Application February 16, 1954
Serial No. 410,734

10 Claims. (Cl. 106—208)

This invention relates to the production of improved conversion products of starch. More particularly, it relates to that class of starch conversion products comprising dextrines and British gums, and especially, borated dextrines and British gums.

It is well known that starch may be converted by heat, with or without added catalysts, to produce the class of starch conversion products known as dextrines, including that type of dextrine ordinarily known as British gums. Depending upon the type and amount of added or natural catalyst present, as well as the time and degree of heating, the resulting conversion products may vary in solubility from those which are essentially insoluble in water to those which are 100% soluble. Similar types of conversion products may sometimes be achieved by treatment of starch with suitable enzymes.

Our invention pertains to those dextrines (including British gums) which are at least 60% soluble in cold water (water at room temperature).

Dextrines are extensively used in a large number of industrial adhesive applications. For this purpose, the dextrine must of course be dispersed or dissolved in water, the dispersion or solution being applied to paper or other surfaces as an adhesive in such operations as convolute or spiral tube winding, case and carton sealing, tight-wrapping paper wrappers on cartons, and the like.

In order to achieve the desired qualities of adhesiveness, viscosity and tackiness, it is customary for many applications to use for the above purposes a borated dextrine, that is, a mixture of dextrine and borax. The borax content may vary, depending upon the particular use, from about 7½% to above 25%, based on the weight of the dextrine. While lesser amounts of borax are sometimes added to dextrines, for various reasons, such mixtures are not suitable for many important industrial adhesive applications.

In many modern, large-scale industrial operations requiring the use of adhesives, relatively large quantities of adhesive must be prepared at one time. Thus in some large operations quantities in the order of 2,000 pounds of dextrine are dissolved in water to supply one day's needs of adhesive. Obviously, any difficulty or delay in preparing the dextrine solution represents a serious point of inefficiency in the particular manufacturing operation involved.

In this connection, it should be noted that when speaking of "dissolving" dextrine in water to form a "solution," one refers to dispersing the dextrine so as to produce a homogeneous material that may range from a clear, transparent fluid to an opaque paste, depending upon the particular dextrine and the amount of water. The more highly converted the dextrine, the greater will be the proportion forming a true solution, the remainder being in the form of a hydrated colloidal dispersion. When referring to a solution of dextrine, therefore, we include in that term any homogeneous dispersion of dextrine in water, regardless of what proportion if any may be truly dissolved in the purely scientific sense.

Borated dextrines, of the types heretofore known, have been characterized by a tendency to lump formation when mixed in water. In other words, when mixing the dry dextrine with water, instead of a smooth, homogeneous dispersion being formed, portions of the dextrine agglomerate into lumps or balls. When examined closely, these lumps appear to consist of an exterior surface composed of wetted, pasty dextrine, enclosing an interior portion which is dry and unwetted by the water. Mere agitation is not sufficient to break up these agglomerates, and in practice the mixture of dextrine and water has to be allowed to stand for as much as twenty-four hours, and even then the lumps do not always disperse. Obviously, this represents a serious bottle-neck in the manufacturing operation of which the adhesive application is a part.

Many attempts have been made to solve this problem of lump formation in dextrine solutions, with varying degrees of success, but none heretofore has resulted in a commercially feasible method for producing borated dextrines which would dissolve in water readily and without perceptible lump formation.

We have now discovered a method for producing substantially non-lumping dextrines. According to our invention, dextrine is treated in the following manner:

(a) The dextrine is moistened, preferably by spraying water upon it, with vigorous agitation, until the dextrine has a moisture content of from about 9% to about 18%, based upon the weight of the anhydrous dextrine.

(b) The thus moistened dextrine is blended with at least about 7½% of borax based upon the weight of the dextrine. Quantities of borax as high as 25% or more may be used, depending upon the particular properties desired in the final product. Borax itself is of course sodium tetraborate decahydrate. However, the borax called for by our process may include sodium metaborate, so long as the total quantity of borax-metaborate, expressed as borax, is present in the proportion of at least 7½%, based on the dextrine. It is understood, therefore, that when we refer to the presence of borax in the mixture of our invention we include in that term borax itself or mixtures of borax and metaborate. The metaborate may be added as a separate ingredient, or it may be formed in situ by adding an appropriate alkali (e. g. sodium hydroxide or sodium carbonate) to the dextrine-borax mix.

(c) In addition to the borax, there is added a normally solid hygroscopic or deliquescent chemical. This latter material may be any chemical capable of absorbing or adsorbing substantial proportions of water, even to the point of going into solution upon exposure to air of normal humidity. Representative examples of such water-sorptive agents are potassium acetate, ammonium acetate, ammonium thiocyanate, calcium chloride, urea, zinc chloride, magnesium chloride, aluminum nitrate, aluminum chloride, ferric nitrate, copper nitrate, magnesium calcium chloride, magnesium nitrate, potassium carbonate, potassium cyanate, potassium thiocyanate and calcium nitrate. In this connection, it should be pointed out that the water-sorbing agent may be organic as well as inorganic. The water-sorbing chemical may be present in the proportion of from about 2½% to at least 100%, based upon the weight of the borax. While larger proportions are not harmful, they appear to be unnecessary. Ordinarily, it is preferred that the chemical be in finely powdered form. It is sometimes found desirable to employ combinations of two or more of such chemicals.

The required amount of moisture may be added to the dextrine at the time of or immediately subsequent to its manufacture, or the moisture may be added to a dry dextrine at the time that the other above-mentioned ingredients are added.

In our preferred practice, water is sprayed into the dextrine, using any convenient blending apparatus, until the dextrine contains from about 9 to 18% moisture. As indicated above, this step may be unnecessary, if the dextrine already contains the required amount of moisture. There are then added the borax (or borax-metaborate, or borax-alkali) and one or more hygroscopic agents, in the proportions noted. The mixture is blended thoroughly to assure uniform admixture.

It has been found that as a result of the combination of these three elements (moisture, borax and hygroscopic agent) the resulting dextrine is substantially changed in appearance, and remarkably improved in its solution characteristics. Whereas ordinary dextrine, as commercially available, is a soft, silky, extremely fine powder which tends even in the dry state to agglomerate and cake somewhat like dry starch, the product of our invention is changed in physical form so as to resemble fine grains of sand, discrete and non-agglomerating. The product of our invention is found to be darker in color than the corresponding untreated dextrine. This, together with the change in physical form, suggests that a chemical and/or physical reaction has taken place within the blend. It is believed that through some interaction of the dextrine with the moisture, the borax, and the hygroscopic material, the original fine particles have been fused into harder, sand-like grains, with some chemical action being indicated by the color change.

When the sand-like dextrine of our invention is mixed with water, there is an amazing absence of any tendency toward lump formation. Each grain appears to absorb water and disperse as an individual entity, as contrasted to the tendency of ordinary dextrines to agglomerate into balls or lumps with dry, unwetted cores.

As a result, the dextrine of our invention may be thoroughly dispersed to produce a working adhesive, in a matter of minutes. The exact time will depend to some extent upon the volume of adhesive being prepared at a given time. For large, commercial batches, a period of from ½ hour to about 4 hours is sufficient to produce a homogeneous, lump-free dispersion. This should be contrasted with the previously known dextrines, which required many times this period for proper dispersion, meaning in practice that the dextrine had to be mixed with water one day for the next day's consumption.

Depending entirely upon availability, economics and the final use to which the adhesive is to be put, the dextrine may be one made from corn, potato, tapioca, sago or any other starch. The remarkable improvements stemming from the combination of ingredients called for by our invention are apparent regardless of the source of the dextrine.

We prefer to employ a dextrine which is 60% to 100% soluble in water in the ratio 1 dextrine : 100 water at 72° F., the solubility being determined as follows: 2 grams of the dextrine are dispersed smoothly in 200 cc. water at 72° F., using a flask which is then stoppered tightly and agitated in a constant temperature bath at 72° F. for 2 hours. The material is then centrifuged for 5 minutes, or until clear. 20 cc. of the clear solution are removed by pipette into a weighed evaporating dish, and evaporated in an oven for 4 hours, at 220° F. After cooling in a desiccator, the weight of the residue is determined. The percent solubility of the dextrine is then calculated from the equation $$\% \text{ solubility} = \frac{\text{wt. of residue} \times 1000}{2}$$

In this connection it should be pointed out that mixtures of dextrines of varying solubilities may be employed, so long as the average solubility as above determined is within the limits 60–100%.

Besides varying in solubility it is known that dextrines also vary in the viscosities of their aqueous dispersions. For the purposes of our invention we prefer to employ dextrines which come within the following viscosity range: when 100 grams of the anhydrous dextrine are dispersed in water with 15 grams of borax, and heated on a boiling water bath for five minutes, between 150 and 600 grams of water will be required in the dispersion to result in a viscosity of 84 centipoises at 72° F. Here too, it is possible to use mixtures of two or more dextrines of varying viscosities, which, in admixture, will fall within the above-described range.

The following examples will further illustrate the embodiment of our invention.

EXAMPLE I

In this and in the subsequent example, all parts given are by weight. The solubility and viscosity figures for the dextrines used in the various examples will be indicated in the table immediately following Example VIII.

100 parts of corn dextrine were sprayed with water, in a blending vessel, until the dextrine contained 16% moisture. Maintaining constant agitation, there were then added 10 parts of borax, 5 parts sodium metaborate and 5 parts of ammonium acetate. Agitation was continued for approximately ½ hour. The resulting composition consisted of free-flowing, sand-like particles.

When 1 part of the above-treated dextrine was mixed with 3 parts of water at room temperature, a smooth, homogeneous dispersion, free of any perceptible lumps, was formed within a half hour. By contrast, when 1 part of the above dextrine-borax-metaborate mixture, without the added ammonium acetate, was mixed with 1.5 parts of water at room temperature, the material immediately formed lumps containing unwetted cores of dextrine, and even after standing overnight lumps were still present.

EXAMPLE II 100 parts of sago dextrine, containing 9% water, were blended thoroughly with 15 parts of borax and 5 parts of potassium acetate, at 185° F.

When mixed with water at 72° F., in the ratio 1 dextrine : 1 water, a smooth, lump-free dispersion was obtained in less than an hour. As indicated previously, when large quantities of dextrine were dissolved, somewhat more time was naturally required, but in no case did the formation of a homogeneous dispersion require more than four hours ( as contrasted to the 12–24 hour periods required with standard borated dextrines).

EXAMPLE III 100 parts of sago dextrine were sprayed with water to achieve a moisture content of 18%. There were then added 20 parts of borax, 0.5 part sodium carbonate and 0.5 part of ammonium acetate. After thorough blending the dextrine darkened somewhat in color and assumed the discrete sand-like granular form previously described.

A smooth, lump-free dispersion was obtained when one part of the above mixture was mixed with 2.5 parts of water at 72° F. for ½ hour.

EXAMPLE IV 100 parts of tapioca dextrine was sprayed with water until the dextrine attained a moisture content of 14%. There were then blended in 7.5 parts borax and 7.5 parts potassium acetate.

The resulting granular dextrine was mixed with water at 72° F., in the ratio of 1 part dextrine : 2 parts water, and a smooth, lump-free dispersion was achieved in less than an hour.

EXAMPLE V 100 parts of potato dextrine, containing 15% moisture, were blended with 14 parts borax, 2 parts magnesium chloride and 5 parts aluminum nitrate. When the resulting sand-like dextrine was mixed with water at 72° F.

in the ratio of 1 dextrine : 2.5 water, a smooth, lump-free dispersion was obtained in less than an hour.

EXAMPLE VI 100 parts of potato dextrine containing 18% moisture were mixed with 7½ parts borax and 7½ parts ammonium acetate. After thorough blending, it was found that the mixture dispersed in 1.5 parts of water at room temperature with remarkable freedom from lump formation.

EXAMPLE VII 100 parts of tapioca dextrine were sprayed with water until the dextrine had a moisture content of 17%. 15 parts of borax and 5 parts of ammonium thiocyanate were then blended thoroughly with the dextrine. The resulting sand-like mixture dispersed readily in 5 parts of water at room temperature, with notable absence of lump formation.

EXAMPLE VIII 100 parts of corn dextrine were sprayed with water until a moisture content of 18% was achieved. There were then thoroughly blended with the dextrine 16 parts borax, 5 parts sodium carbonate and 5 parts ammonium acetate.

When mixed with water at room temperature a smooth dispersion was quickly formed with substantially less lump formation, as compared to a similar blend minus the ammonium acetate, and particularly so as compared to a blend where the ammonium acetate was not present and the moisture content of the dextrine was substantially less than 9%.

*Table of solubilities and viscosities*

In the above examples the dextrines used were characterized by the following solubilities and viscosities, measured by the herein described procedures:

| Example | Solubility, percent | Viscosity (grams $H_2O$ to give viscosity of 84 cps.) |
| --- | --- | --- |
| I | 100 | 150 |
| II | 100 | 185 |
| III | 100 | 220 |
| IV | 100 | 350 |
| V | 100 | 240 |
| VI | 100 | 240 |
| VII | 80 | 570 |
| VIII | 60 | 450 |

When the moisture content or solubility of the dextrine is in the lower part of the specified ranges, or the proportion of hygroscopic agent is relatively low, it is sometimes found advisable to allow the dextrine-borax-hygroscopic agent blend to age for several weeks before dispersing in water. As an alternative, one may apply heat up to about 185° F. at the time of blending the dextrine, borax and hygroscopic agent. Either of these steps aids in effecting the reaction among the components of the blend, and thus results in maximum improvement in the final product.

Summarizing, our invention comprises the unique combination of three critical elements—high moisture dextrines, borax and a hygroscopic agent, in the required relative porportions, to produce a dextrine that is outstandingly superior in its freedom from lump formation when mixed in water at room temperatures.

We claim:

1. A borated cold-water-soluble dextrine product comprising a mix of a cold-water-soluble, dry, high-moisture-content dextrine, borax and a normally solid hygroscopic salt, said dextrine when added to the mix having a moisture content in the range of from about 9% to about 18%, based upon the weight of the dextrine in the anyhydrous state, said mix being characterized by comprising discrete and non-agglomerating grains in the dry state and by being non-agglomerating when mixed with cold water.

2. The borated dextrine product of claim 1 in which the borax in the mix is in the proportion in the range of from about 7½% to about 25% based on the weight of the dextrine.

3. A borated cold-water-soluble dextrine product comprising a mix of a cold-water-soluble, dry, high-moisture-content dextrine, borax and a normally solid hygroscopic salt, the borax being present in the mix in an amount within the range of from about 7½% to about 25% based on the weight of the dextrine, said mix being characterized by comprising discrete and non-agglomerating grains in the dry state and by being non-agglomerating when mixed with cold water.

4. A borated cold-water-soluble dextrine product comprising an intimate mix of a 60% to 100% cold-water-soluble, high-moisture-content dextrine, borax and a normally solid hygroscopic salt, said dextrine when added to the mix having a moisture content in the range of from about 9% to about 18% based on the weight of the dextrine in an anhydrous state, the original ingredients of the mix each consisting of fine, solid particles, said mix being characterized by the fusion of said fine, solid particles into dry, hard, sand-like, discrete and non-agglomerating grains which when mixed with cold water are non-agglomerating and readily soluble.

5. The borated dextrine product of claim 4 in which the borax in the mix is in an amount within the range of from about 7½% to about 25% based on the weight of the dextrine, and the hygroscopic salt is in an amount within the range of from about 2½% to about 100% based on the weight of the borax.

6. A borated cold-water-soluble dextrine product comprising an intimate mix of a 60% to 100% cold-water-soluble, high-moisture-content dextrine, borax and a normally solid hygroscopic salt, the borax being present in an amount within the range of from about 7½% to about 25% based on the weight of the dextrine, and the hygroscopic salt being present in an amount within the range of from about 2½% to about 100% based on the weight of the borax, the original ingredients of the mix each consisting of fine, solid particles, said mix being characterized by the fusion of said fine, solid particles into dry, hard, sand-like, discrete and non-agglomerating grains which when mixed in cold water are non-agglomerating and readily soluble.

7. The method of making a borated cold-water-soluble dextrine product which consists in intimately comixing a cold-water-soluble, high-moisture-content dextrine, borax and a normally solid hygroscopic salt, the dextrine ingredient of said mix comprising a normal-moisture-content dextrine to which moisture has been added so that the moisture content thereof is in the range of from about 9% to about 18% based on the weight of the dextrine in the anhydrous state, the ingredients of the mix each consisting of fine, solid particles, and thereby effecting the fusion of said fine, solid particles into a product composed of dry, hard, sand-like, discrete and non-agglomerating grains, said product when mixed in cold water being non-agglomerating and readily soluble.

8. The method of making the borated dextrine product of claim 7 in which the borax in the mix is in an amount within the range of from about 7½% to about 25% based on the weight of the dextrine, and the hygroscopic salt is in the range of from about 2½% to about 100% based on the weight of the borax.

9. The method of making a borated cold-water-soluble dextrine product which consists in intimately comixing a cold-water-soluble, high-moisture-content dextrine, borax and a normally solid hygroscopic salt, the borax being present in an amount within the range of from about 7½% to about 25% based on the weight of the dextrine, the ingredients of the mix each consisting of fine, solid particles, and thereby effecting the fusion of said fine, solid particles into a product composed of dry, hard, sand-like, discrete and non-agglomerating grains, said product when mixed in cold water being non-agglomerating and readily soluble.

10. The method of making a borated cold-water-soluble dextrine product which consists in intimately comixing a cold-water-soluble, high-moisture-content dextrine, borax and a normally solid hygroscopic salt, the borax being present in an amount within the range of from about 7½% to about 25% based on the weight of the dextrine, and the hygroscopic salt being present in an amount within the range of from about 2½% to about 100% based on the weight of the borax, the ingredients of the mix each consisting of fine, solid particles, and thereby effecting the fusion of said fine, solid particles into a product composed of dry, hard, sand-like, discrete and non-agglomerating grains, said product when mixed in cold water being non-agglomerating and readily soluble.

References Cited in the file of this patent

UNITED STATES PATENTS

| 349,648 | Hovey et al. | Sept. 21, 1886 |
| 2,144,610 | Bauer et al. | Jan. 24, 1939 |

FOREIGN PATENTS

| 489,379 | Great Britain | July 26, 1938 |

OTHER REFERENCES

Kerr: "Chemistry and Industry of Starch," (1944), pp. 262, 263.